United States Patent [19]

van Santen

[11] 4,045,287
[45] Aug. 30, 1977

[54] FUEL ASSEMBLY WITH EASILY DETACHABLE COMPONENTS

[75] Inventor: Aart van Santen, Vasteras, Sweden

[73] Assignee: Aktiebolaget ASEA-ATOM, Vasteras, Sweden

[21] Appl. No.: 643,512

[22] Filed: Dec. 22, 1975

[30] Foreign Application Priority Data

Dec. 30, 1974 Sweden .............................. 7416341

[51] Int. Cl.² .......................... G21C 3/30; G21C 3/10
[52] U.S. Cl. ................................................ 176/78; 176/79
[58] Field of Search ..................... 176/78, 79; 151/37, 151/44, 55, 52, 50, 54, 57, 58, 69

[56] References Cited

U.S. PATENT DOCUMENTS

| | | | |
|---|---|---|---|
| 1,484,402 | 2/1924 | Martin | 151/44 |
| 3,431,170 | 3/1969 | Lass | 176/78 |
| 3,775,249 | 11/1973 | Clapham | 176/78 |

*Primary Examiner*—Stephen C. Bentley
*Assistant Examiner*—Donald P. Walsh

*Attorney, Agent, or Firm*—Watson, Cole, Grindle & Watson

[57] ABSTRACT

A fuel assembly includes a bundle of vertical fuel rods. Some of the rods are tying rods provided with extended upper end plugs, and the rest of the rods are spring-furnished ones, the spring forces balancing the tying forces exerted by the tying rods between a top plate and a bottom plate. The top plate is grid-like and provided with attachment holes for the upper end plugs. The lower end plugs of the tying rods are screwed in threaded holes in the bottom plate. Each of the upper end plugs of the tying rods has a portion located above the top plate and provided with a nut. Rotation of the nut is limited by at least one downwardly directed projection on the nut, the end surface of which lies below the upper edge of the top plate. The maximally allowable length of this projection is less than the maximum shortening of the springs that can be carried out by exerting a downwardly directed force on the top plate. With such a projection length the projections can clear the side and the nut can be rotated and removed.

1 Claim, 5 Drawing Figures

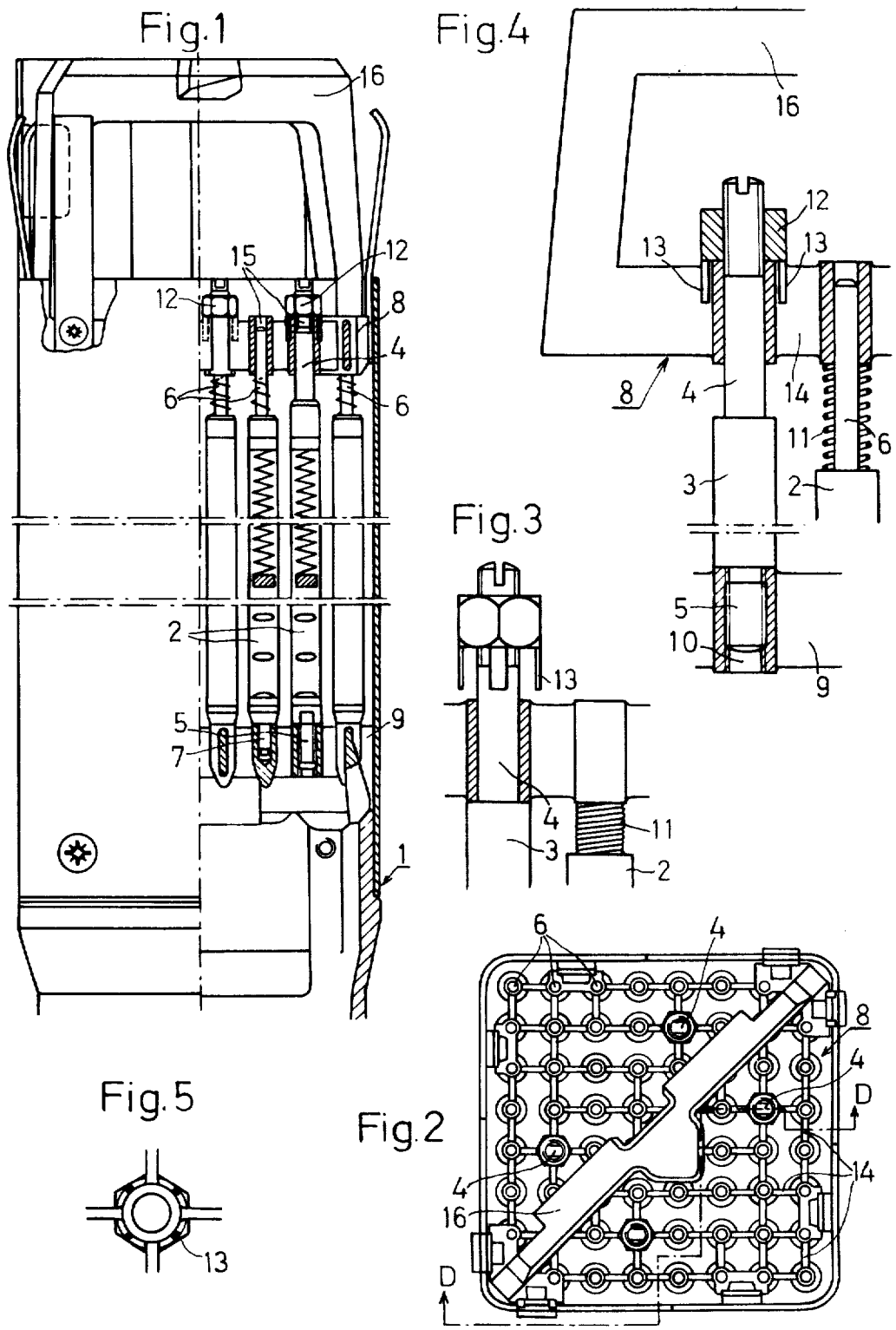

FUEL ASSEMBLY WITH EASILY DETACHABLE COMPONENTS

BACKGROUND OF THE INVENTION

1. Field of the Invention

The present invention relates to a fuel assembly with easily detachable components, which assembly comprises a bundle of fuel rods with a plurality of substantially parallel, vertical fuel rods, which are provided with extended upper and lower end plugs, a bottom plate and a grid-formed top plate provided with attachment holes for said upper end plugs, a predominant number of upper end plugs being each surrounded by a compressible spring, a number of fuel rods being screwed by their lower end plugs in threaded holes in said bottom plate, the upper end plugs of these fuel rods having a portion, located above said top plate, which is provided with a nut.

2. The Prior Art

A fuel assembly of this type is known from U.S. Pat. No. 3,741,868. The fuel rods shown in this patent, which are passed through the top plate and provided with nuts on the upper side of said top plate, have no locking device for the nuts which is suitable when slacking off the nut by a remote-controlled tool.

SUMMARY OF THE INVENTION

This deficiency is remedied by a fuel assembly according to the invention.

According to the invention, nuts on the top plate have downward projections which can engage against the side of the grid of the top plate. The length of the projection is such that, when the top plate is pressed down by a downwardly directed spring compressing force, the projection is cleared so that the nut can be unscrewed.

BRIEF DESCRIPTION OF THE DRAWINGS

The invention will be described in the following with reference to the accompanying drawings, in which FIG. 1 shows the upper and lower parts of a fuel assembly according to the invention, in side view as well as in a vertical section along the line D-D of FIG. 2, which shows the fuel assembly seen from above.

FIG. 3 shows the relation between the fuel rods and the top plate while a nut is being screwed on, and FIG. 4 the same when the nut has been screwed on.

FIG. 5 shows a horizontal section through the projections of the nut.

DESCRIPTION OF THE PREFERRED EMBODIMENTS

In the drawings, 1 designates a fuel assembly which is to be inserted into a nuclear reactor core from above. The assembly comprises a bundle of fuel rods 2 and 3, 3 designating tying rods, which are present in a number of four for each fuel assembly. Each tying fuel rod has an upper end plug 4 and a lower end plug 5, the corresponding end plugs of the other fuel rods being designated 6 and 7.

The fuel rods are arranged with the upper end plugs each axially movable in one hole of a grid-formed top plate 8, each of the lower end plugs then being arranged in a hole of a bottom plate 9. The end plugs 7 are arranged to be axially movable in relation to the bottom plate, whereas the lower end plugs of the tying fuel rods 3 are screwed into threaded holes 10 of the bottom plate 9. The upper end plugs 6 of the fuel rods 2 are each provided with a spring 11, which, when the fuel assembly has been assembled, is compressed to a certain degree, but not completely. The sum of all the spring forces is taken up by the four tying fuel rods 3. As mentioned, these are screwed to the bottom plate. Furthermore, they are provided with relatively long upper end plugs 4, which are passed through the holes of the top plate with a relatively small clearance and which are each provided with a nut 12, which is specially designed so that it may be locked in such a way that dismantling may be performed without difficulty by remote-controlled tools. The nut 12 is formed with a number of downwardly-directed projections 13, of which at least one — in case of a very slight unintentional rotation of the nut — will make contact with one side 14 of the grid-like top plate 8, running between two attachment holes 15, so that the nut 12 is locked with respect to the top plate. The nut is locked as long as the end surface of the projection 13 extends below the upper edge of the side 14 of the grid.

When the fuel assembly 1 is to be dismantled, for example in order to exchange some damaged fuel rod, the top plate 8 is pressed down, which can be done, for example, by applying a downwardly-directed force on a lift yoke 16 attached to the top plate 8. The springs 11 are then compressed, as shown in FIG. 3, and the top plate 8 will come to such a low level in relation to the nut 12 that the nut may be turned around.

I claim:

1. Fuel assembly with easily detachable components, which fuel assembly comprises a bundle of substantially vertical fuel rods (2, 3) which are provided with upper (4,6) and lower (5,7) end plugs, a bottom plate (9) and a grid-formed top plate (8) provided with attachment holes for said upper end plugs, compressible individual springs (11) surrounding some of said upper plugs, a plurality of fuel rods (3) having their lower end plugs (5) screwed in threaded holes (10) in said bottom plate, the upper end plugs (4) each having a portion located above said top plate and provided with a nut (12), means limiting the rotational movement of the nut (12) comprising at least one downwardly-directed nut projection (13), the end surface of which lies below the upper edge of a side (14) of the grid of the top plate (8), said grid side running between two attachment holes, and the length of said projection being, at the most, equal to the maximum elastic shortening of said compressible springs (11) obtainable by a reduction of the distance between the top and bottom plates by exerting a downwardly-directed force on the top plate.

* * * * *